June 29, 1965 H. B. BIEHN 3,191,752
BULK MATERIAL DISTRIBUTOR
Filed March 28, 1963 2 Sheets-Sheet 1

INVENTOR.
HAROLD B. BIEHN
BY
J. Warren Kinney Jr.
ATTORNEY

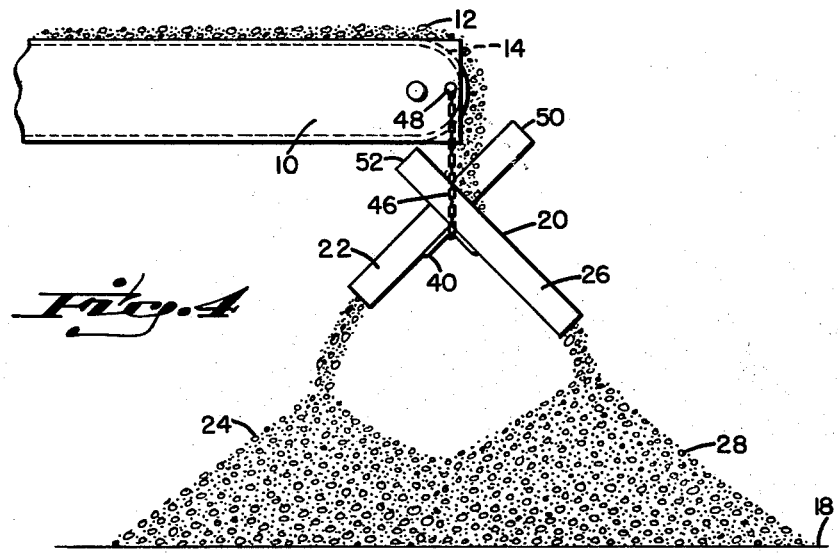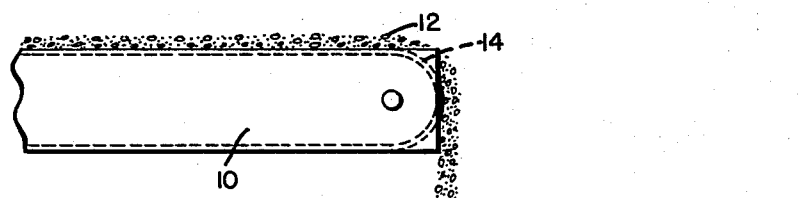

United States Patent Office 3,191,752
Patented June 29, 1965

3,191,752
BULK MATERIAL DISTRIBUTOR
Harold B. Biehn, Greenfield, Ohio
(P.O. Box 110, Washington Courthouse, Ohio)
Filed Mar. 28, 1963, Ser. No. 268,819
4 Claims. (Cl. 198—36)

This invention relates to a bulk material distributor, such as may be utilized in the transfer of bulk material from one location to another with the rise of a chute or other conveyor.

Under ordinary conditions, bulk material transferred by means of a conveyor leaves the unloading end of the conveyor to form a single pile of material that develops into cone shape. If the material constitutes an aggregation of particles of differing sizes, there is a natural tendency for the particles to separate to some extent, with the larger particles accumulating near the bottom of the pile while the fines congregate along the slopes and near the top of the conical pile.

As it is often desirable to compile the bulk material without separation of its constituents, there has been felt a need for a method of compiling the bulk material in such a manner as to preserve as much as possible an initial uniform distribution of the fines and the larger particles within the mass. Avoidance of separation would be particularly desirable, for example, in the compiling of concrete aggregate consisting of several sizes of stone or gravel particles, and sand, destined for delivery into a concrete mixer.

An object of the invention is to provide a simple and inexpensive means operative automatically at the discharge end of a chute or other conveyor of bulk material, to minimize the tendency of its constituents to separate in compiling.

Another object is to provide a distributor for accomplishing the foregoing objective, and at the same time serving to spread the material pile over a large area to minimize coning, this being desirable in the loading of cars or bins to adequately cover the floor or bottom and achieve effective loading without waste of space within the car, bin, or other receptacle.

A further object is to provide a distributor of the character stated, which has no moving parts requiring servicing or replacement, and which may be applied to a chute or other conveyor with a minimum of labor and expense.

The foregoing and other objects are attained by the means described herein and illustrated upon the accompanying drawings, in which:

FIG. 4 is a side elevational view of a bulk material conveyor having the device of the invention applied thereto.

FIG. 5 is a side elevational view of the same conveyor from which the distributor has been detached, and showing the compilation of bulk material as discharged conventionally.

FIG. 6 is a view similar to FIG. 4, showing the distributor applied to a gravity-type conveyor or chute.

Figure 1:
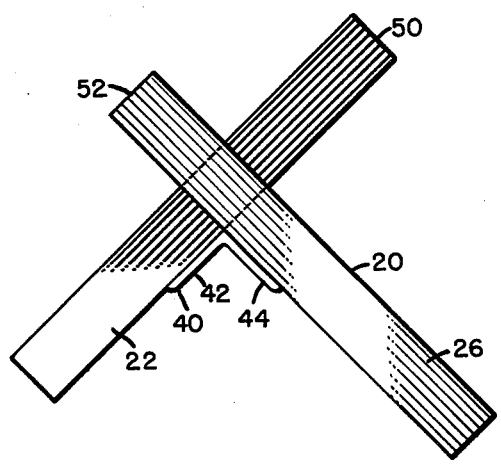
FIG. 1 is an end elevational view of the distributor embodying the present invention.
Figure 2:
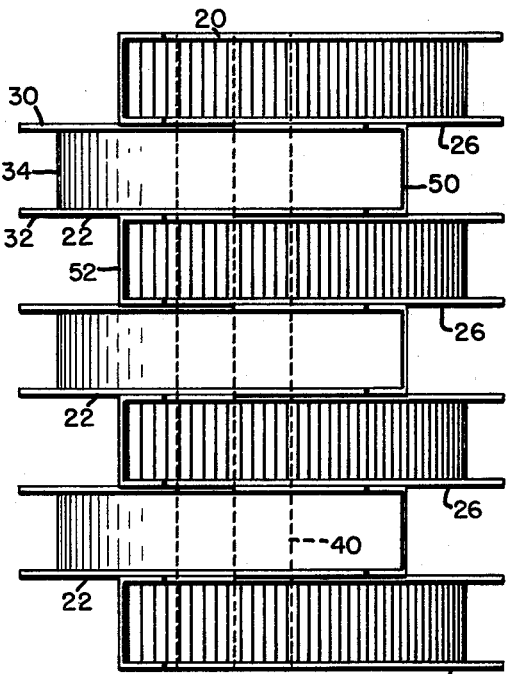
FIG. 2 is a top plan elevation thereof.
Figure 3:
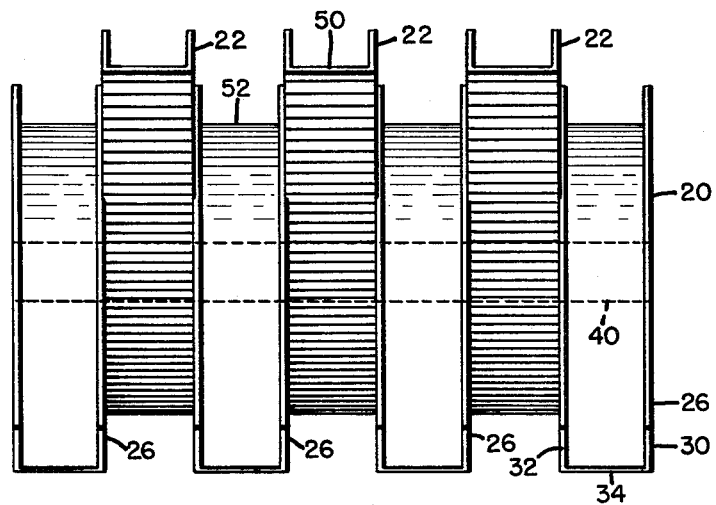
FIG. 3 is a side elevation of the same.

With reference to FIG. 5, the character 10 indicates a conventional conveyor of bulk material 12, such conveyor usually including an endless belt 14 driven to discharge the material off the unloading end of the conveyor and onto a pile 16. As the drawing indicates, the material will compile upon a floor or other supporting surface 18 as a tall cone, occupying a minimal area of the surface 18.

If the surface 18 is the floor of a freight car or other receptacle, the base of the pile may fail to cover such surface to any appreciable extent by the time the apex of the conical pile builds up to the height of the conveyor, thereby necessitating the the use of hand labor or some auxiliary means of spreading the pile to effectively fill the receptacle. Also, as the drawing indicates, the heavier or larger particles of the bulk material will accumulate near the base of the pile, while the fines accumulate along the slopes and at the top portion of the pile, to result in an undesirable separation under certain conditions. For example, the separation may be undesirable if the fines and coarse particles are to be kept uniformly dispersed in the mass, as is usually the case in compiling concrete aggregate or the like.

FIG. 4 illustrates the same mechanical conveyor of FIG. 5, equipped with the distributor 20 of the invention, and showing how the distributor operates to spread the pile 16 over a larger area of surface 18, while at the same time reducing the height of the pile and minimizing separation of the mixed fines and coarse particles fed by the conveyor. With the use of the distributor 20, a car or bin may be loaded very effectively without requiring hand work or other auxiliary and additional means for spreading the material within the car bin or other receptacle, to achieve economical and full capacity loading.

The distributor of the invention may be quite simply fabricated with the use of a plurality of channel iron members so arranged as to provide two groups of chutes for directing bulk material in opposite directions as the material leaves the conveyor. The channel members of group 22 thus will direct material onto a pile 24 (FIG. 4), while the group 26 directs material from the conveyor onto a second pile 28 adjacent to the first pile of material. As FIG. 4 indicates, the multiple compilation serves to spread the discharged material over floor or surface 18, while at the same time discouraging separation of the fines from the coarse particles, thereby to retain substantially the desired original mixture as delivered by the conveyor.

Each channel member has the usual parallel side walls 30 and 32 flanking a bottom wall 34. All of the channel members may be of the same length, though not necessarily so. One group of channel members 22 may be alternated with the channel members of the other group 26, to direct material from the conveyor in substantially opposite directions to form the piles 24 and 28. In arranging the channel members, those of one group may be welded or otherwise secured to the side walls of those of the other group, the two groups of channel members being disposed substantially at right angles to one another with their open tops uppermost. For reinforcing the channel groups, an elongate angle iron 40 may be welded or otherwise secured to the outside faces of the channel bottoms, FIG. 1, with the legs 42 and 44 of the angle iron supporting the bottom walls of all the channel members of both groups.

With the angle member 40 serving as a saddle, the assembly of channel members may be suspended, by means of a chain or equivalent suspension element 46, from hangers 48 located near the discharge end of the conveyor 10. The channel members preferably are so suspended beneath the conveyor discharge end, that each channel member of each group 22 and 26 will receive a share of the bulk material discharged by the conveyor, and as nearly as may be practicable the channel members are to receive substantially equal amounts of such material.

To prevent overshooting of bulk material from the conveyor, the receiving ends 50 of channel members 22 may be disposed at a higher elevation than the corresponding receiving ends 52 of the channels of group 26.

This arrangement makes possible also a desirable disposition of channel ends 52 beneath the conveyor discharge end. It is considered advantageous to effective compiling and distribution of material upon floor 18 that the suspension means 46 be flexible for free swinging movement. The opposite ends of chain 46 preferably are simply hooked onto hangers 48 at opposite sides of the conveyor, for easy and expeditious mounting and dismounting of the distributor with relation to the conveyor end.

The illustration of FIG. 6 displays a simple modification, in which the conveyor 54 is of the gravity chute type. In all other respects, the structure and function of the FIG. 6 combination are identical with FIG. 4.

It is to be understood that various modifications and changes may be made in the structural details of the apparatus, within the scope of the appended claims, without departing from the spirit of the invention.

What is claimed is:

1. In combination, a conveyor having a discharge end for delivering a substantially constant stream of bulk material, a plurality of U-shaped elongate chutes arranged in groups with the chutes of each group aligned, each chute having an open top and a bottom wall, chutes of one group being alternately arranged in side by side relationship with and fixed at an angle to the chutes of a second group, all of said chutes being fixed to adjacent chutes intermediate their ends with their open tops uppermost to receive each a portion of the bulk material fed by the conveyor, the chutes of said one group and second group by reason of their angular disposition serving to discharge material at two opposite spaced apart regions of a supporting surface, and means swingingly suspending the chute assemblage from the discharge end of the conveyor with the discharge ends of the chutes of one group being disposed outwardly of the delivery end of said conveyor and with the receiving ends of the said one group being disposed above the receiving ends of the chutes of the other group.

2. The combination as set forth in claim 1, wherein is included an elongate supporting saddle fixed transversely along the bottom walls of all of the chutes of both groups.

3. A distributor of bulk material delivered by a conveyor, comprising in combination, a plurality of U-shaped elongate chutes arranged in groups with the chute of each group aligned, each chute having an open top, a bottom wall, a receiving end, and a discharge end, chutes of one group being alternately arranged in side by side relationship with and fixed at an angle to the chutes of a second group, all of the chutes of said one group being fixed to adjacent chutes intermediate the ends thereof with the open tops of all chutes exposed upwardly to receive material from the conveyor, the receiving ends thereof being disposed at a higher elevation than the discharge ends, the chutes of said one group and second group by reason of their angular disposition serving to discharge material therefrom at two opposite spaced apart regions of a supporting surface and wherein the receiving ends of the chutes of one group are disposed at a higher elevation than the receiving ends of the chutes of the second group.

4. The device as set forth in claim 3, wherein is included an elongate supporting saddle fixed transversely along the bottom walls of all the chutes of both groups, and wherein said chutes of said one group are arranged at a right angle to the chutes of the second group.

References Cited by the Examiner

UNITED STATES PATENTS

| | | | |
|---|---|---|---|
| 280,994 | 7/83 | Andrus | 73—421 |
| 358,052 | 2/87 | Metcalf | 193—3 |
| 3,103,841 | 9/63 | Sanders | 198—50 X |

FOREIGN PATENTS

| | | |
|---|---|---|
| 19,864 | 10/90 | Great Britain. |
| 429,598 | 5/35 | Great Britain. |

SAMUEL F. COLEMAN, *Primary Examiner.*

EDWARD A. SROKA, *Examiner.*